US012043055B2

(12) United States Patent
Gubela, Jr.

(10) Patent No.: US 12,043,055 B2
(45) Date of Patent: Jul. 23, 2024

(54) RETROREFLECTIVE ELEMENT HAVING A SECURITY ELEMENT

(71) Applicant: Hans-Erich Gubela, Jr., Kappelrodeck (DE)

(72) Inventor: Hans-Erich Gubela, Jr., Kappelrodeck (DE)

(73) Assignee: Hans-Erich Gubela, Jr., Kappelrodeck (DE)

( * ) Notice: Subject to any disclaimer, the term of this patent is extended or adjusted under 35 U.S.C. 154(b) by 416 days.

(21) Appl. No.: 17/382,513

(22) Filed: Jul. 22, 2021

(65) Prior Publication Data

US 2022/0048309 A1 Feb. 17, 2022

(30) Foreign Application Priority Data

Aug. 14, 2020 (DE) ..................... 10 2020 004 967.2

(51) Int. Cl.
*B42D 25/328* (2014.01)
*G02B 5/122* (2006.01)
(Continued)

(52) U.S. Cl.
CPC ........... *B42D 25/328* (2014.10); *G02B 5/122* (2013.01); *G06K 7/1426* (2013.01); *G06K 19/06065* (2013.01)

(58) Field of Classification Search
CPC ...... G07D 7/005; G07D 7/003; B42D 25/425; B42D 25/324; B42D 25/328; G02B 5/122;
(Continued)

(56) References Cited

U.S. PATENT DOCUMENTS 3,810,804 A 5/1974 Rowland
5,339,302 A 8/1994 Takahashi et al.
(Continued)

FOREIGN PATENT DOCUMENTS

DE 42 36 779 A1 5/1993
DE 696 19 691 T2 8/2002
(Continued)

OTHER PUBLICATIONS

Gubela "Retroreflector With Optical Elements for Light Projection and Coding and Method for Detecting a Light Pattern", Nov. 21, 2019, DE 102018112043 A1 (Year: 2019).*
(Continued)

*Primary Examiner* — Sang H Nguyen
(74) *Attorney, Agent, or Firm* — Collard & Roe, P.C.

(57) ABSTRACT

A retroreflective element, for example a retroreflector or a retroreflective film, includes a regular arrangement of multiple reflective triples, each having three side surfaces that form an angle between 88° and 92°, preferably between 89° 50' and 90° 10' relative to one another, and particularly preferably stand perpendicularly on one another. At least one selected triple in the arrangement has a security element having at least one diffractive structure on at least one first side surface. A modulation depth of the security element is selected in such a manner that the security element cannot be perceived when the retroreflective element is illuminated at an illumination angle <10°.

14 Claims, 5 Drawing Sheets

(51) Int. Cl.
*G06K 7/14* (2006.01)
*G06K 19/06* (2006.01)

(58) Field of Classification Search
CPC .... G02B 5/1861; G02B 5/124; G06K 7/1426; G06K 19/06065
See application file for complete search history.

(56) References Cited

U.S. PATENT DOCUMENTS

| | | | |
|---|---|---|---|
| 5,969,863 A * | 10/1999 | Staub | G02B 5/1823 283/902 |
| 6,043,936 A | 3/2000 | Large | |
| 6,974,218 B2 | 12/2005 | Schilling et al. | |
| 7,717,575 B2 | 5/2010 | Gubela, Sr. et al. | |
| 10,007,233 B2 | 6/2018 | Schilling et al. | |
| 10,525,759 B2 | 1/2020 | Rahm et al. | |
| 10,761,249 B2 | 9/2020 | Gubela | |
| 2003/0193717 A1* | 10/2003 | Gubela, Sr. | B29D 11/00605 359/529 |
| 2008/0258456 A1* | 10/2008 | Rahm | B42D 25/29 283/85 |
| 2009/0097118 A1* | 4/2009 | Gubela, Sr. | E01F 9/619 359/530 |
| 2013/0033772 A1* | 2/2013 | Kobayashi | G02B 5/124 359/837 |
| 2018/0128951 A1* | 5/2018 | Panzlaff | G02B 5/12 |
| 2019/0227205 A1* | 7/2019 | Gubela | B29D 11/0074 |
| 2020/0025982 A1* | 1/2020 | Gubela | G02B 5/122 |

FOREIGN PATENT DOCUMENTS

| | | |
|---|---|---|
| DE | 103 12 708 B4 | 6/2007 |
| DE | 10 2005 061 749 A1 | 7/2007 |
| DE | 10 2009 012 300 A1 | 9/2010 |
| DE | 10 2012 105 571 A1 | 1/2014 |
| DE | 20 2019 001 143 U1 | 4/2019 |
| DE | 10 2018 112 043 A1 | 11/2019 |
| EP | 1 894 043 B1 | 11/2008 |
| EP | 3 598 186 A1 | 1/2020 |
| WO | 2020/074746 A1 | 4/2020 |

OTHER PUBLICATIONS

Heitsch Woflgan et al "Method for Testing Products for Their Authenticity, and Security Features Used Therefor", WO 02059839 A2. (Year: 2002).*

Trolenberg et al "Method for Producing a Security Document and Security Document", D06/22, 2017, E 102015226602 A1 (Year: 2017).*

Lochbiler Han Security Element and Manufacturing Method Therefor:, Oct. 11, 2018, DE 102017003532 A1 (Year: 2018).*

"Color-selective holographic retroreflector array for sensing applications", authors: Rajib Ahmed, Ali K. Yetisen, Seok Hyun Yun, and Haider Butt, published in Light: Science & Applications (2017), 6, preview online Sep. 5, 2016, published online Feb. 24, 2017, total of 9 pages.

DIN 67 520, Part 1, Sep. 1982, total of 4 pages (See specification for relevance).

European Search Report dated Jan. 21, 2022 in European Application No. 21000227.5 with English translation of the relevant parts.

German Search Report dated Jan. 5, 2021 in German Application No. 10 2020 004 967.2 with English translation of the relevant parts.

* cited by examiner

RETROREFLECTIVE ELEMENT HAVING A SECURITY ELEMENT

CROSS REFERENCE TO RELATED APPLICATIONS

Applicant claims priority under 35 U.S.C. § 119 of German Application No. 10 2020 004 967.2 filed Aug. 14, 2020, the disclosure of which is incorporated by reference.

BACKGROUND OF THE INVENTION

1. Field of the Invention

The invention relates to a retroreflective element, a method for orientation of a retroreflective element, an apparatus for detection of a signal coded in the security element of the retroreflective element, and a forming tool for the production of the retroreflective element.

2. Description of the Related Art

Due to constantly progressing miniaturization in the sector of retroreflectors, in particular in the sectors of displays and films, and the resulting more difficult production of the miniaturized structures, in particular of Full Cube structures, the desire exists to protect these structures from counterfeiting. At the same time, the desire exists to have as little reflective power as possible be lost due to a marking for protection against counterfeiting.

The term "retroreflector" is understood to mean optical elements that pass incident light, coming in within a specific angle range, back to the light source, for the most part, independent of the precise angle of incidence. In this regard, certain deviations of the retroreflected beam from the direction of incidence are possible and actually desired, in part, for example if the light source and the intended receiver of the reflected radiation are not in precise alignment, viewed from the reflector. Applications in which the retroreflector consists of an arrangement of multiple triples, each having reflective side surfaces that stand essentially perpendicular to one another, of which each side surface rotates about a component of the directional vector, are very frequent. In many applications, the triples consist of tetrahedron structures (for example U.S. Pat. No. 3,810,804 A, applicant: Rowland Dev. Corp.), i.e. of half cubes that are cut off along a diagonal. Such pyramid structures have the disadvantage that they have a maximum degree of effectiveness of only approximately 66% because of dead surfaces, i.e. surfaces whose reflective beams cannot be reflected further.

Arrangements in which the three side surfaces of a triple are essentially square and have the same size are also very frequent. They then form a corner (in other words three surfaces that come together at a point) of a cube. In the projection onto a light entry surface, a regular hexagon occurs with this structure. Such a special triple will be referred to here as a Full Cube. In the following, the point of departure will be Full Cube structures. Without restriction of generality, however, the invention can also be used in the case of retroreflectors having pyramid structures or in the case of retroreflectors in which projection onto the light entry surface yields a rectangle, such as described, for example, in DE 4236779 A1 (applicant: Hans-Erich Gubela, Sr.), as well as in the case of all other triple structures having three side surfaces that stand almost perpendicular.

A retroreflector characterized by a hologram in a corner has been available on the market from IMOS Gubela GmbH for a long time. In this regard, however, the hologram is immediately visible if the retroreflector is illuminated at a small angle of illumination.

In DE 10312708 B4 (proprietor: OVD Kinegram AG, filing date: Mar. 21, 2003), a retroreflector composed of a plastic layer laminate and having a relief-like matte structure is disclosed, which changes a polarization direction of the reflected light but does not demonstrate any diffraction effects for visible light.

In the scientific literature ("Color-selective holographic retroreflector array for sensing applications", authors: Rajib Ahmed, Ali K. Yetisen, Seok Hyun Yun, and Haider Butt, published in Light: Science & Applications (2017), 6 preview online 5 Sep. 2016), a holographic image of a cube corner reflector is discussed. This cube corner reflector has the same phase properties as a normal cube corner reflector but does not itself have any retroreflective properties.

Important definitions can be taken over from the sector of retroreflectors for road traffic:

The observation angle $\alpha$ is the angle between the straight lines that connect the center points of an illuminating light source and a receiver with the center point of a sample.

The illumination angle $\beta$ is understood to be the angle between the straight connecting line of the light source with the center point of the illuminated surface and the center vertical line of the illuminated surface.

The angle of rotation $\varepsilon$ is the angle by which the sample is rotated clockwise ($+\varepsilon$) or counter-clockwise ($-\varepsilon$) about its center vertical line, starting from any desired established position, viewed in the direction of illumination.

The definitions of the terms illumination angle, observation angle, and angle of rotation have been taken from DIN 67520 Part 109.82. In this regard, this standard is incorporated into the present application.

SUMMARY OF THE INVENTION

The present invention is based on the task of protecting retroreflectors, in particular microstructures, from impermissible counterfeiting and forming, and of providing them with a security feature that can be seen at an illumination angle >30°, and, at the same time, of losing as little reflective power in the retroreflective structures as possible at illumination angles <10°.

These and other tasks are accomplished task is accomplished by a retroreflective element according to the invention, a method for orienting a retroreflective element according to the invention, and an apparatus for detection of a signal coded in the security element of the retroreflective element. A molding tool for the production of a retroreflective element according to the invention is also described herein.

The retroreflective element according to the invention can be a retroreflector or a retroreflective film, for example. It comprises a regular arrangement of multiple reflective triples, each having three side surfaces that stand approximately perpendicular to one another. In other words they form an angle, relative to one another, between 88° and 92°, preferably between 89° 50' and 90° 10', and particularly preferably stand perpendicular to one another. At least one selected triple in the arrangement of the retroreflective element according to the invention has a security element on at least one first side surface. Of course, the security element can also be affixed to other side surfaces of the selected triple or to other first side surfaces of other triples. The security element can also be affixed in a regular pattern. Selected triples having the security element can themselves, in turn, form lettering.

A security element is an element that serves to check authenticity. The authenticity test can be performed using mechanical means or by a visual or haptic impression. The security element serves for making impermissible forming evident. The security element according to the invention has diffractive structures such as a simple diffraction grating or a hologram. Diffractive structures are structures based on the principle of diffraction.

A modulation depth of the security element according to the invention is selected in such a manner that the security element cannot be perceived if the retroreflector is illuminated at an illumination angle <10°. In this regard, modulation depth is understood to be the amplitude of grating modulation. The modulation depth is calculated from the maximum height difference between peak and valley within a grating line of the optical grating, or the maximum height difference between peak and valley of a hologram. The lower the modulation depth is, the lower the optical path difference or phase difference is that is brought about by the path of the light in the deep part, in other words along a normal vector of the first side surface, and the less intensive the diffraction image of the security element is at small illumination angles. At large illumination angles, the effect of the grating distance perpendicular to the normal vector of the first side surface predominates, and the grating structure becomes visible. The modulation depth of the optical structures is selected to be as low as possible, according to the invention. At a line distance of the grating lines of 1.5 µm, a modulation depth of approximately 20-30 nm has proven to be suitable. Using such a structure, the security feature can be recognized if illumination takes place at large illumination angles. In normal operation, for example in sensors, photoeyes or displays, the security feature is invisible.

In order for the security feature to remain invisible in normal operation, it is particularly advantageous if the diffraction efficiency of the diffractive structures is less than 7%. The diffraction efficiency is understood to be the quotient of the energy that flows into a diffraction maximum of the first order in relation to the diffraction maximum of the zeroth order.

In order for the security feature to be recognizable with the naked eye due to its color reflections at large illumination angles, line distances of the diffractive structures on the order of maximally 3 times the desired wavelength of visible light are advantageous. In particular, line distances between 500 nm and 2.0 µm are advantageous. Line distances between 1.4 µm and 1.6 µm are particularly advantageous. If multiple triples have security elements, it is advantageous to vary the line distances of the security elements of adjacent triples slightly, so that in spite of different illumination with reference to the individual triples, an optically uniform overall impression is formed. In other words, the line distance of a second security element is greater by a factor between 1.01 and 2 times than the line distance of the first security element. Preferably the second security element is situated farther away from a light source or a transmitter in the preferred illumination direction than the first security element. The precise factor of the different line distances depends on the difference in angle relative to the light source and must be calculated individually. For recognition by machine, other grating distances can also be selected, which then suitably diffract wavelengths outside of the visible spectrum, for example. The modulation depth should be between 0.1% and 10% of the line distance, preferably between 1% and 2% of the line distance.

In the case of small structures, in other words structures having widths across flats of the triples between 50 µm and 500 µm, which are difficult to produce, marking with a security element according to the invention is particularly interesting. The width across flats is defined as the distance between two parallel edges of the hexagon in the projection onto the light entry surface. Such structures have use in displays, for example, on which an observer is not supposed to recognize the security feature during normal use. Such structures also have application in flexible retroreflector films, for which small widths across flats lead to better flexibility of the film.

Depending on the desired visual effect, the proportion of the surface that the security element covers on the first side surface of the triple provided with the security element can be freely selected. If as little light as possible is supposed to go into diffraction even at large illumination angles, the covered surface can amount to between 5% and 50%. If the security element is supposed to be found as quickly as possible, it is practical to cover between 50% and 98% of the first side surface with the security element.

According to an advantageous embodiment of the invention, the selected triple has a security element on each of the three side surfaces. In this regard, the modulation depth of the security element of the first side surface differs from the modulation depth of the security element of the second side surface. The two modulations depths in turn differ from the modulation depth of the security element of the third side surface. As a result, a different brightness impression can be produced from different viewing directions, and thereby orientation of the retroreflective element according to the invention is facilitated.

The retroreflector according to the invention can be oriented in simple manner. In particular in the case of round retroreflectors, the problem has existed until now that the light power is dependent on the orientation, and either a visible marking has to be affixed on a light entry surface so as to indicate a preferred direction, or the structures must be arranged in different regions, as proposed in Utility Model DE 202019001143 U1 (proprietor: Imos Gubela GmbH, filing date Mar. 11, 2019), and these arrangements also lead to losses due to individual triples being cut up. With a retroreflector according to the invention, simple orientation of the reflector is possible.

Orientation takes place in the following steps:

First, a retroreflective element according to the invention is made available. The retroreflective element is illuminated at a predetermined illumination angle, for example at an illumination angle between 30° and 45°, and analyzed at a predetermined observation angle. The positions of a transmitter and of a receiver are therefore defined in advance. The receiver can be situated in a housing with the transmitter, arranged adjacent to it, for example. This arrangement corresponds to a small observation angle of approximately 0° to 2°. The receiver can also be arranged in an axis relative to the center vertical line of the retroreflective element. In this case, the observation angle is equal to the illumination angle.

In a further step, the retroreflective element according to the invention is rotated step by step. In other words, the rotation angle ε is changed in 5° steps, for example. Subsequently, the receiver, for example a CCD camera, records a color value. A color value is understood to mean the absolute value of the vector to a color location. An evaluation unit, for example a computer with corresponding graphics software, compares the received color value with a reference value. Subsequently precise adjustment can still be carried out with a lesser step width, for example a step width of 0.5°.

In the event that a signal is coded in the security element, an apparatus for reading out the coded signal is required. The apparatus for detection of the signal coded in the security element of the retroreflective element comprises at least a transmitter, a receiver, a holder for the retroreflective element, and an evaluation unit.

The transmitter transmits electromagnetic waves having at least a predetermined wavelength. The wavelength is preferably in the range of visible light. An individual wavelength is suitable if it is supposed to be detected only when a signal is detected at all at a predetermined position of the transmitter and of the receiver.

If a predetermined color image is supposed to be detected, white light, for example having a color temperature of 2600 K, is a suitable light source of the transmitter. The recorded image establishes the position of the retroreflective element. The retroreflective element is therefore fixed in place. It is therefore possible to determine a center vertical line of the entry surface from the position of the retroreflective element in the recorded image.

The apparatus is characterized in that the transmitter is arranged at an angle greater than 30° and smaller than 90° relative to the center vertical line. Preferably, the angle amounts to between 30° and 60°. Particularly preferred angles are the angles of inclination of the edges, in other words the diagonal angle in a cube, of 54.74°, the complementary angle to this diagonal angle being 35.26°, because then a light path exists, in each instance, with which a beam of light impacts the grating perpendicularly, and also, for reasons of symmetry and room, an angle of 45°.

It is advantageous if the receiver is affixed at the position of a mirror image of the transmitter, reflected at the center vertical line, directly on the center vertical line, or in a housing with the transmitter.

According to an advantageous embodiment, the evaluation unit is configured to compare a predetermined light value with a light value measured at the receiver, recording deviations, and to make them visible for a human observer. If the deviations are too great, it is advantageous if the evaluation unit issues a warning or an alarm.

The apparatus for detection of the coded signal can be provided in addition to a regular photoeye in a sensor arrangement that usually works at small illumination angles (<5°).

The apparatus according to the invention, with the retroreflective element according to the invention, can also be used to detect error beams caused by outside light sources, for example in sensors, because a color component can be detected in addition. If the color component is not detected by a receiver and an evaluation unit, but a signal is received by the retroreflector, the evaluation unit can issue an error message.

Production of the retroreflective element according to the invention preferably takes place by means of molding a master. The master as a molding tool is a negative of the retroreflective element according to the invention. The molding tool therefore has a regular arrangement of triples, each having three side surface that form an angle between 88° and 92°, preferably between 89° 50' and 90° 10', relative to one another, and particularly preferably stand perpendicular on one another. Low points in the molding tool become high points in the retroreflective element. The same holds true for the security element and its diffractive structures.

Due to inaccuracies during molding and shrinkage processes of the plastic used, the modulation depth should amount to approximately 1.01 times the desired modulation depth in the retroreflective element.

For large numbers of pieces, the injection-molding process has proven itself. For prototypes, it is possible to use other forming methods such as hot embossing, if greater forming precision is required. For the production of retroreflective films, it is possible to use imprinting methods such as roll-to-roll imprinting methods with UV-hardening polymers. In the case of all these forming methods, the security element must be applied to the master in advance. This application can be done by the usual methods of lithography with masks and subsequent etching. The modulation depth can be influenced by the duration of etching. Methods using laser interference ablation, however, are cheaper. In this regard, beams of a UV ultra-short pulse laser (for example a wavelength of 197 nm) are brought into interference with a grating interferometer, in such a manner that a standing wave is formed. Material is removed from the master at the locations of constructive interference. The modulation depth of the structure increases with the intensity of the radiation used.

If the retroreflective element according to the invention or the molding tool is renewed, for example formed using galvanic methods, the security element is retained to a weaker degree. Impermissible counterfeiting carried out using a retroreflective element that is in circulation or using a molding tool, can be discovered by means of comparing the intensities at illumination angles >30°.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
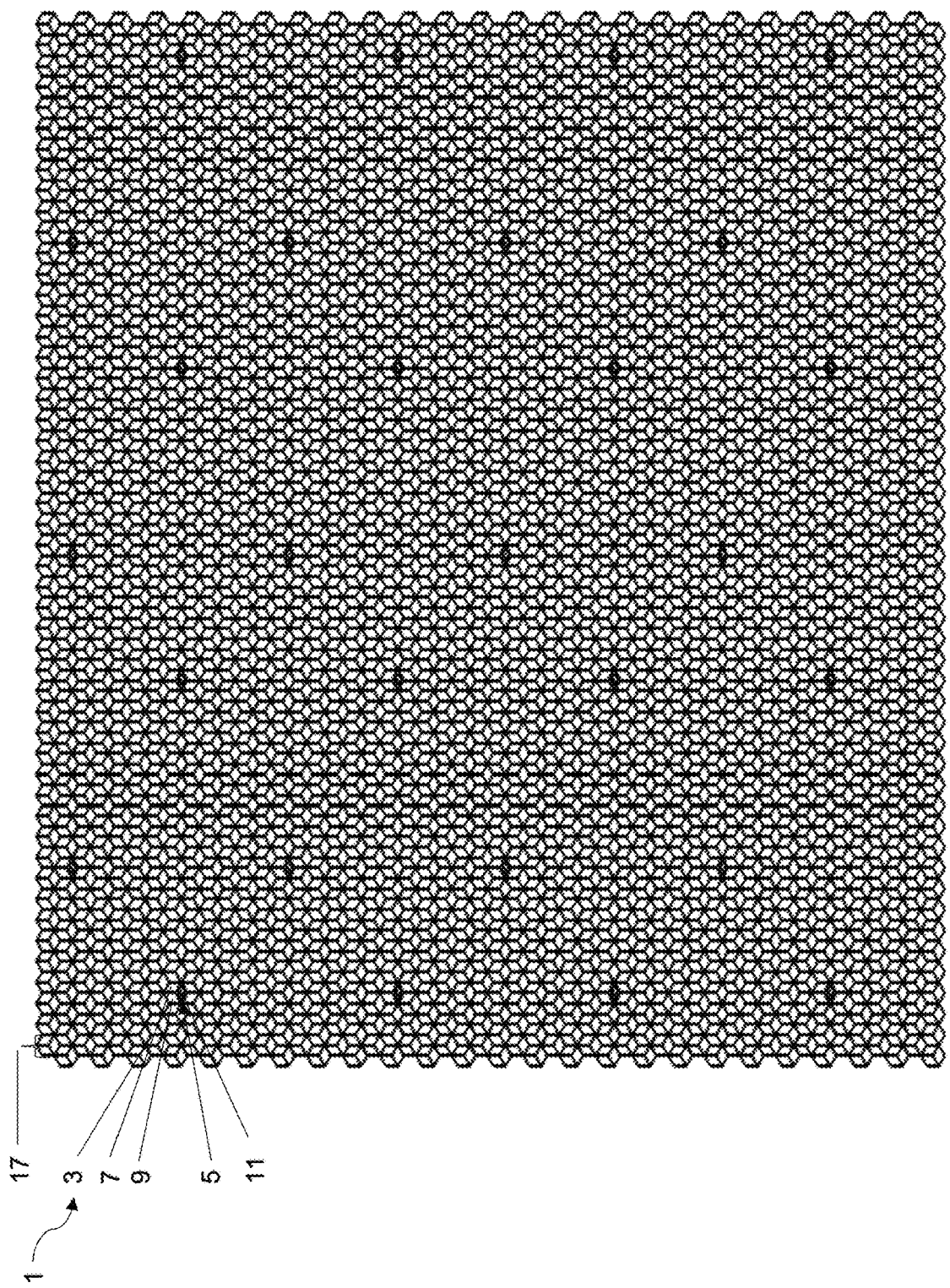
FIG. 1 shows a retroreflective element according to the invention, viewed from a light entry side.

In FIG. 1, a retroreflective element 1 according to the invention is shown, seen from a light entry side. The retroreflective element 1 consists of a regular arrangement of triples 3. Each triple 3 has the shape of a hexagon in this view. Each triple 3 has a first side surface 5, a second side surface 7, and a third side surface 9, which stand perpendicular on one another, in each instance. A security element 11 is arranged on the first side surface 5 of selected triples 3, at a regular distance from one another. The width across flats 17 is the distance between parallel edges of the hexagon.

Figure 2:
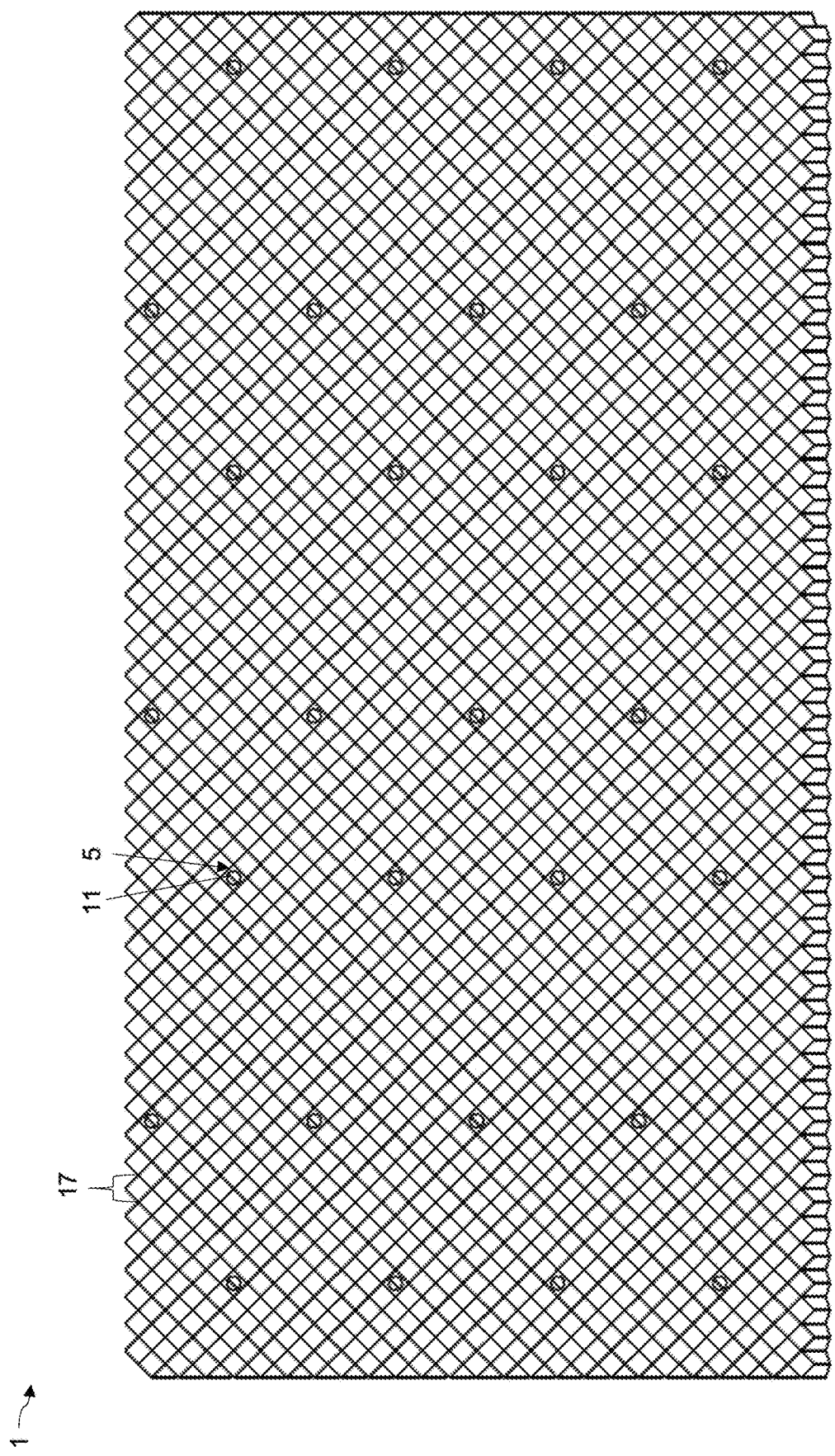
FIG. 2 shows the retroreflective element from FIG. 1 from a further perspective.

FIG. 2 shows the retroreflective element 1 from the perspective of a top view of the first side surfaces 5 with a regular arrangement of security elements 11. In this perspective, the width across flats 17 corresponds to the diagonal of an individual first side surface 5.

Figure 3:
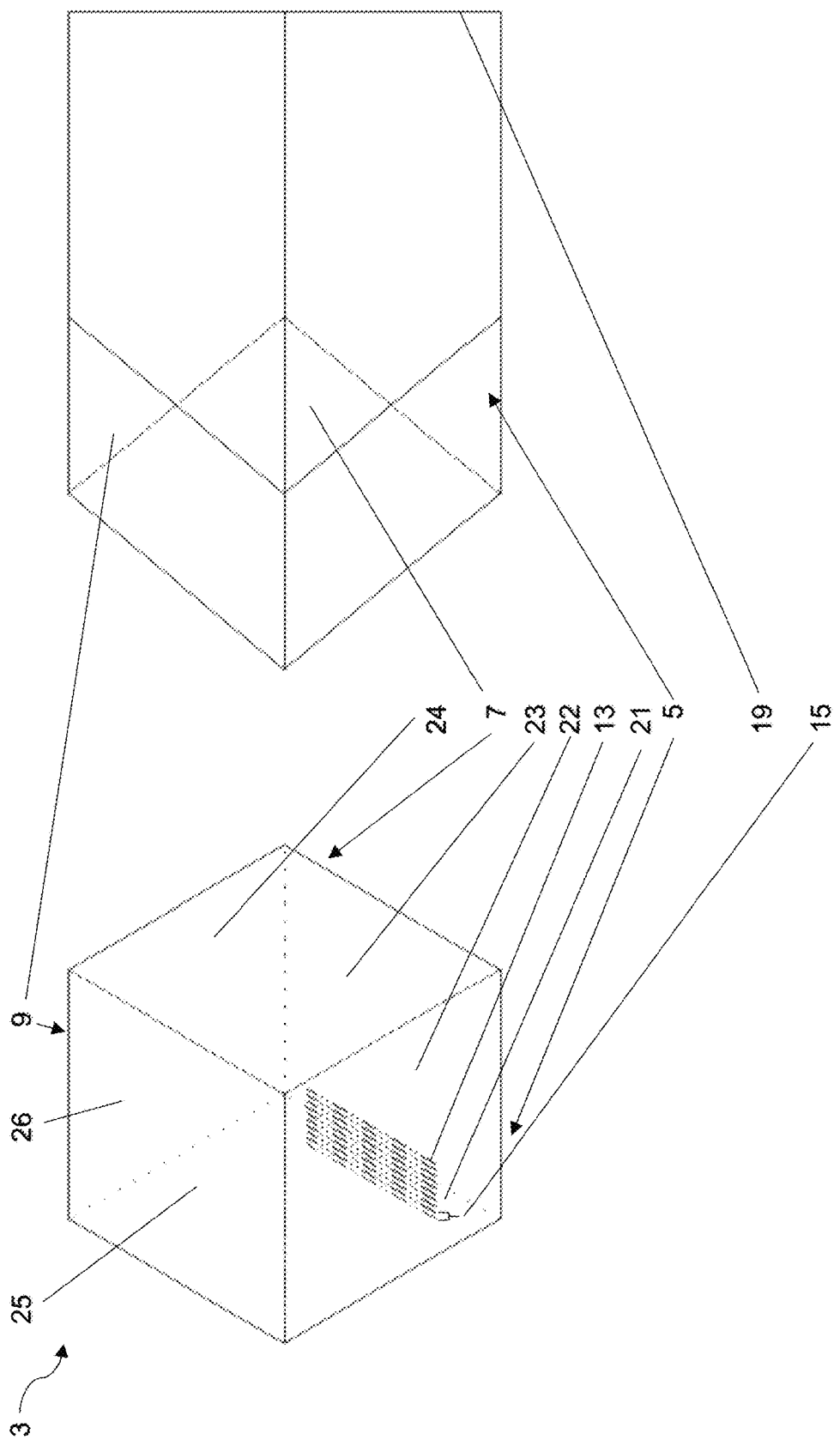
FIG. 3 shows, symbolically, a single triple having a security element according to the invention.

FIG. 3 symbolically shows an individual triple 3 of a retroreflector according to the invention. Using this figure, the complex light path through a retroreflective element according to the invention will be explained as an example. The grating lines of the diffraction grating as a diffractive structure 13 with the line distance 15 (shown symbolically here) run parallel to a center diagonal line of the surface 5. It is known from EP 1894043 B1 (proprietor: Imos Gubela GmbH), for example, that light can take six different paths through a single triple 3, because in the case of three side surfaces 5, 7, 9, six different permutations of the sequence are possible. In the hexagonal projection onto a light entry surface 19, a sub-surface 21, 22, 23, 24, 25, 26 corresponds to each of the possible paths. For light that is diffracted to the zeroth order by the security element, the sequence in which light passes through the side surfaces 5, 7, 9 does not play any role, because the zeroth order behaves like a mirror. At higher orders of diffraction, the total deflection of the reflected beam to the zeroth order follows the diffraction law:

$$d = g \cdot (\sin \varphi - \sin \varphi_i) = n^* \lambda$$

with d as the optical path difference, g as the grating distance, $\varphi$ as the angle of diffraction perpendicular to the surface normal line of the diffraction grating, $\varphi$ as the incidence direction perpendicular to the surface normal line of the diffraction grating, n as the order of diffraction, and $\lambda$ as the wavelength of the electromagnetic radiation.

The incidence angle $\varphi_i$ onto the diffractive structure 13 depends not only on the illumination angle but also on the sequence of the illuminated sub-surfaces. For light that first falls on the side surface 5 having the diffractive structure 13, the incidence angle is equal to the diffraction angle of the side surface 5 relative to the light entry surface 19 plus (calculated vectorially) the illumination angle modified at the light entry surface in accordance with the law of diffraction. The diffraction angle $\varphi$ acts like a very large angle error of the side surface 5 for the further path through the retroreflector, by way of the side surfaces 7 and 9, so that the approximations of small angle errors that are usual in the literature no longer apply, if the side surfaces 7 and 9 are still impacted at all, and the beam is not lost as a misdirected beam. On the other hand, in the case of this beam path, the diffractive structure 13 still works at such great illumination angles when normally a total reflection of the side surface 5 would be lost. Then diffraction beams of a higher order can nevertheless impact the side surfaces 7 and 9 and be reflected by them.

A beam that hits the first side surface 5 as a second reflection surface after reflection at the sub-surface 25 of the third side surface 9 or the sub-surface 23 of the second side surface 7 also has a great angle error after diffraction and is therefore difficult to follow.

Only light that impacts first on the sub-surfaces 24 and 26 and is reflected by them then impacts last onto the side surface 5 having the diffractive structure 13. Here, the exit angle of the retroreflected beam is approximately the illumination angle, vectorially added to the diffraction angle that is caused by the diffractive grating 13.

By explaining the light path, it is shown why it is desirable to suppress higher orders of diffraction at small illumination angles if at all possible. The greater illumination angles, however, can be used in targeted manner for coding, at a predetermined orientation of a transmitter and a receiver and at a predetermined rotation angle ($\varepsilon$).

Because the light paths as shown are very complex, the reference value of a color distribution must be determined by means of ray-tracing software or read out from a table determined by experiments, for the adjustment process described above and for the apparatus for detection of the signal coded in the security element of the retroreflective element.

Figure 4:
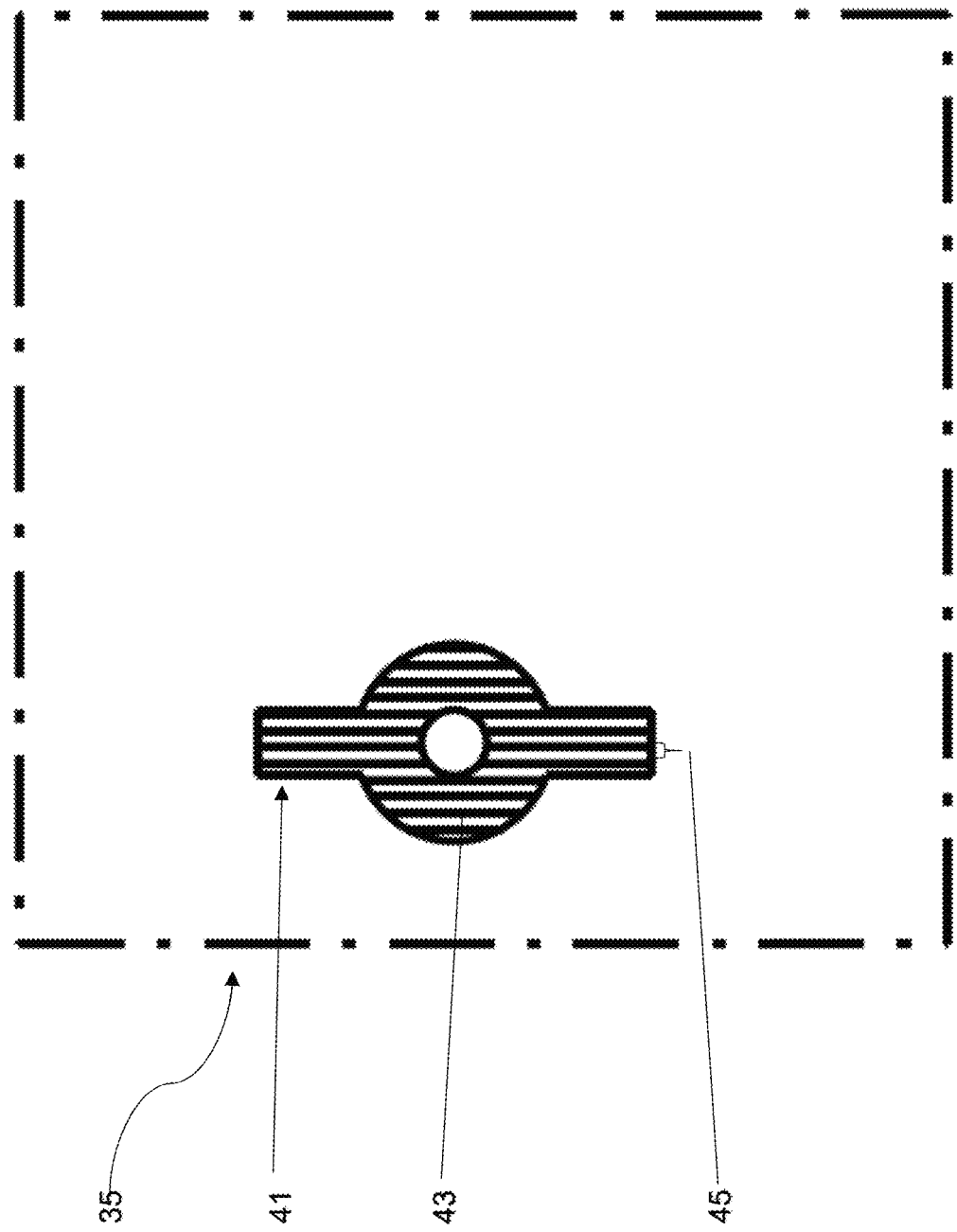
FIG. 4 shows a further example of a diffractive grating.

FIG. 4 shows a further example of a security element 41 having a diffractive grating 43 on a first side surface 35 of a retroreflector according to the invention in a different embodiment. Here, too, the line distance 45 is indicated only symbolically enlarged, and should not be understood as being to an indication of dimension. The individual grating lines of the diffraction grating run parallel to a side edge of the surface. In comparison with the grating according to FIG. 3, the grating lines are therefore rotated by 45°. The course of the grating lines imparts a preferential direction to the side surface 35, so that light coming in perpendicular to it is more likely to be diffracted than light coming in parallel to it.

According to an advantageous embodiment of the invention, the selected triple 3 has a security element 11 on each of the three side surfaces 5, 7, 9, 35. In this regard, the modulation depth of the security element 11 of the first side surface 5 differs from the modulation depth of the security element of the second side surface 7. The two modulations depths in turn differ from the modulation depth of the security element of the third side surface 9. As a result, a different brightness impression can be produced from different viewing directions, and thereby orientation of the retroreflective element according to the invention is facilitated.

Figure 5B:
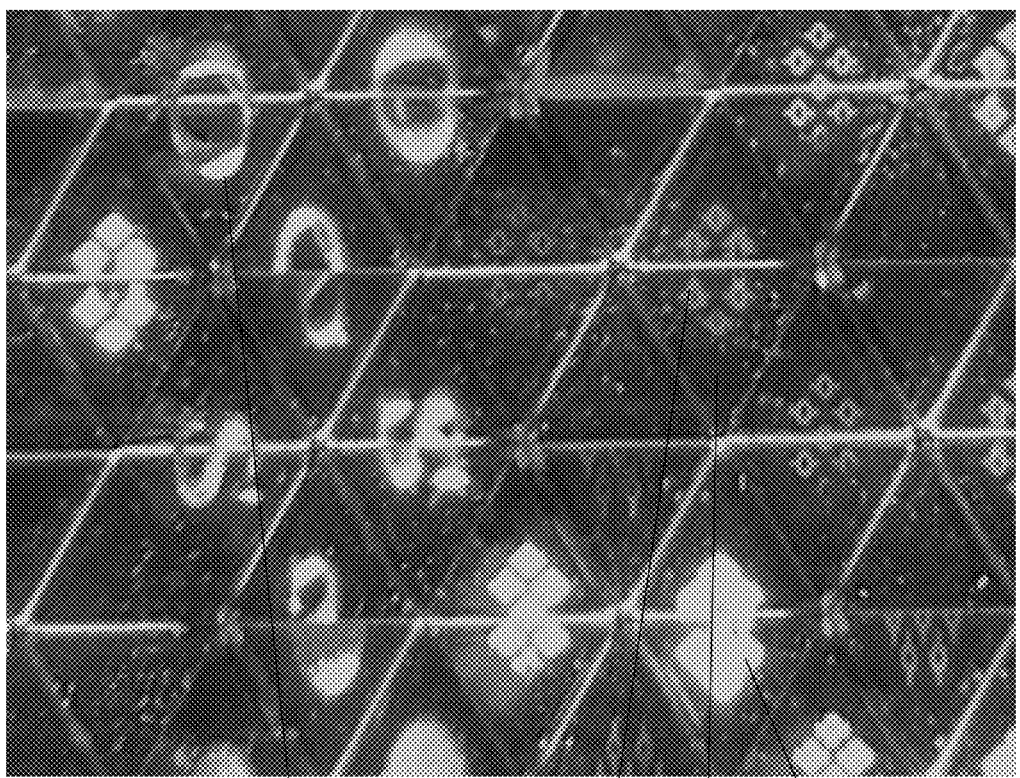
FIGS. 5A and 5B show an example of a retroreflector according to the invention in comparison with different lettering according to the state of the art.
Figure 5A:
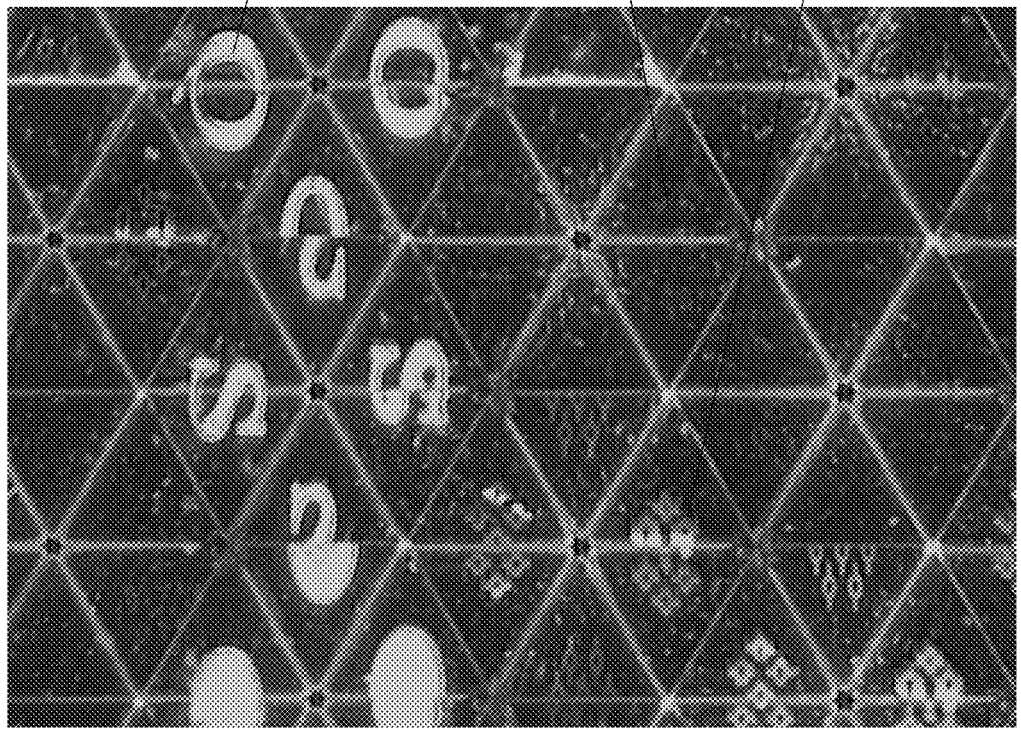

FIGS. 5A and 5B show an example of a retroreflector according to the invention in comparison with different lettering in accordance with the state of the art. FIG. 5A shows a microscope image of the retroreflector with light from above, i.e. at an illumination angle of 0°. FIG. 5B shows the same section of the retroreflector with illumination at an angle of approximately 45° at a slant from top left. Conventionally ablated letters 91 absorb incoming light and thereby reduce the reflection capacity of the reflector. The security feature 93 according to the invention is invisible under light from above, and due to the predominant diffraction to the zeroth order, the security feature 93 optically behaves like the reflection surface 97 that surrounds it. As soon as the light source is shifted and illumination takes place at illumination angles greater than 30°, the security feature appears in a color spectrum that is dependent on the illumination angle. A conventional diffractive structure 95 is also visible under light from above, i.e. reflection power is issued in a diffraction maximum of at least the first order, and the grating structure is noticeable immediately, even when used for sensor applications.

Although only a few embodiments of the present invention have been shown and described, it is to be understood that many changes and modifications may be made thereunto without departing from the spirit and scope of the invention.

| Reference Symbol List: | |
|---|---|
| 1 | retroreflective element |
| 3 | triple |
| 5, 35 | first side surface |
| 7 | second side surface |
| 9 | third side surface |
| 11, 41 | security element |
| 13, 43 | diffractive structure |
| 15, 45 | line distance |
| 17 | width across flats |
| 19 | light entry surface |
| 21, 22, 23, 24, 25, 26 | sub-surface |
| 91 | ablated letters |
| 93 | security feature |
| 95 | visible diffractive structure |

What is claimed is:

1. A retroreflective element comprising a regular arrangement of multiple reflective triples, each triple having first, second, and third side surfaces that form an angle between 88° and 92° relative to one another;
    wherein at least a first selected triple in the arrangement has a first security element having at least one diffractive structure on the first side surface of the first selected triple;
    wherein the first security element has a modulation depth selected so that the first security element is imperceptible when the retroreflective element is illuminated at an illumination angle <10°;
    wherein the at least one diffractive structure of the first security element has a line distance between 500 nm and 2.0 µm; and
    wherein the modulation depth is between 0.1% and 10% of the line distance.

2. The retroreflective element according to claim 1, wherein the angle formed by the first, second, and third side surfaces is between 89° 50' and 90° 10' relative to one another.

3. The retroreflective element according to claim 1, wherein a diffraction efficiency of the at least one diffractive structure is at most 7%.

4. The retroreflective element according to claim 1, wherein a width between flats of the retroreflective element is between 50 µm and 500 µm.

5. The retroreflective element according to claim 1, wherein a width between flats of the retroreflective element is between 100 µm and 300 µm.

6. The retroreflective element according to claim 1, wherein a signal is coded in the first security element.

7. A method for orientation of a retroreflective element, the method comprising the following steps:
    i. providing the retroreflective element, wherein the retroreflective element comprises a regular arrangement of multiple reflective triples, each triple having first, second, and third side surfaces that form an angle between 88° and 92° relative to one another, wherein at least a first selected triple in the arrangement has a first security element having at least one diffractive structure on the first side surface of the first selected triple, and wherein the first security element has a modulation depth selected so that the first security element is imperceptible when the retroreflective element is illuminated at an illumination angle <10°;
    ii. illuminating the retroreflective element at a predetermined illumination angle, and observing and evaluating a received signal at a predetermined observation angle;
    iii. changing a rotation angle ε in increments;
    iv. comparing a received color value of the first security element with a predefined color value, wherein the color value is an absolute value of a vector to a color location; and
    v: repeating steps iii and iv until the received color value agrees within a tolerance with the predefined color value.

8. The method according to claim 7, wherein the illumination angle is between 30° and 60°.

9. The method according to claim 7, wherein the illumination angle is 45°.

10. The method according to claim 7, wherein the observation angle is equal to the illumination angle ±1°.

11. The method according to claim 7, wherein the observation angle is <1°.

12. A retroreflective element comprising a regular arrangement of multiple reflective triples, each triple having first, second, and third side surfaces that form an angle between 88° and 92° relative to one another;
    wherein at least a first selected triple in the arrangement has a first security element having at least one diffractive structure on the first side surface of the first selected triple;
    wherein the first security element has a modulation depth selected so that the first security element is imperceptible when the retroreflective element is illuminated at an illumination angle <10°;
    wherein at least a second selected triple has a second security element having a second diffractive structure; and
    wherein a line distance of the second security element is between 1.01 and 2 times the line distance of the first security element.

13. The retroreflective element according to claim 12, wherein the line distance of the second security element is between 1.01 and 1.1 times the line distance of the first security element.

14. A retroreflective element comprising a regular arrangement of multiple reflective triples, each triple having first, second, and third side surfaces that form an angle between 88° and 92° relative to one another;
    wherein at least a first selected triple in the arrangement has a first security element having at least one diffractive structure on the first side surface of the first selected triple;
    wherein the first security element has a modulation depth selected so that the first security element is imperceptible when the retroreflective element is illuminated at an illumination angle <10°;
    wherein the first selected triple has first security elements on the first, second, and third side surfaces, respectively; and
    wherein the modulation depth of the first security element of the first side surface differs from the modulation depth of the first security element of the second side surface, and the modulation depths of the first security elements of the first and second side surfaces differ from the modulation depth of the first security element of the third side surface.

* * * * *